United States Patent
Berry et al.

(10) Patent No.: US 9,174,488 B2
(45) Date of Patent: Nov. 3, 2015

(54) PIVOTING AXLE SYSTEM

(71) Applicant: JLG Industries, Inc., McConnellsburg, PA (US)

(72) Inventors: Dave Berry, Hagerstown, MD (US); Andrew J. Bean, Greencastle, PA (US); Justin R. Dean, Walkersville, MD (US)

(73) Assignee: JLG INDUSTRIES, INC., McConnellsburg, PA (US)

( * ) Notice: Subject to any disclaimer, the term of this patent is extended or adjusted under 35 U.S.C. 154(b) by 0 days.

(21) Appl. No.: 14/332,056

(22) Filed: Jul. 15, 2014

(65) Prior Publication Data

US 2014/0327221 A1   Nov. 6, 2014

Related U.S. Application Data

(63) Continuation-in-part of application No. 13/789,728, filed on Mar. 8, 2013, now Pat. No. 8,888,122.

(60) Provisional application No. 61/612,597, filed on Mar. 19, 2012.

(51) Int. Cl.
*B60B 35/10* (2006.01)
*B60G 3/02* (2006.01)
*B66C 23/62* (2006.01)
*B66F 9/075* (2006.01)
*B60G 17/0165* (2006.01)

(52) U.S. Cl.
CPC ............. *B60B 35/1054* (2013.01); *B60B 35/10* (2013.01); *B60G 3/02* (2013.01);
(Continued)

(58) Field of Classification Search
CPC ............ B60G 3/02; B60G 3/08; B60G 3/145; B60G 7/00; B60G 7/003; B60G 7/006; B60G 2200/422; B60G 2206/50; B60G 2300/09; B60G 2300/40; B60D 55/112; B60D 7/142; B60D 21/14; B62D 7/06; B62D 49/0678; B60B 35/10; B60B 35/1054; B60B 35/109; B60B 29/008; B66F 9/07522
USPC ........ 280/5.52, 6.15, 638; 180/209, 212, 253, 180/41
See application file for complete search history.

(56) References Cited

U.S. PATENT DOCUMENTS

| | | | |
|---|---|---|---|
| 2,936,034 A | * | 5/1960 | Der Lely Cornelis Van et al. .............................. 180/41 |
| 3,306,390 A | | 2/1967 | Jamme |

(Continued)

FOREIGN PATENT DOCUMENTS

| | | |
|---|---|---|
| DE | 10 2009 036 306 | 2/2011 |
| EP | 1 580 100 | 9/2005 |

(Continued)

OTHER PUBLICATIONS

European Examination Report dated Nov. 11, 2014 issued in European Patent Application No. 13159534.0, 4 pp.

*Primary Examiner* — Paul N Dickson
*Assistant Examiner* — Timothy Wilhelm
(74) *Attorney, Agent, or Firm* — Nixon & Vanderhye P.C.

(57) ABSTRACT

A pivoting axle system for an aerial lift vehicle with a chassis includes a left axle supporting a left wheel and a right axle supporting a right wheel. The left and right axles are pivotable between a transport position and a working position. A first hydraulic cylinder is connected at one end to the chassis on a right side of a vehicle center line and at an opposite end to the left axle, and a second hydraulic cylinder is connected at one end to the chassis on a left side of the vehicle center line and at an opposite end to the right axle. In the working position, the first and second hydraulic cylinders are prevented from deflection beyond a yield point.

14 Claims, 6 Drawing Sheets

(52) U.S. Cl.
CPC ............ *B66C 23/62* (2013.01); *B66F 9/07522*
(2013.01); *B60G 17/0165* (2013.01); *B60G 2300/40* (2013.01); *B60Y 2200/15* (2013.01)

(56) References Cited

U.S. PATENT DOCUMENTS

| | | | |
|---|---|---|---|
| 3,899,037 A | | 8/1975 | Yuker |
| 4,395,191 A | * | 7/1983 | Kaiser .......................... 414/694 |
| 5,137,101 A | * | 8/1992 | Schaeff .......................... 180/8.1 |
| 5,655,615 A | * | 8/1997 | Mick .......................... 180/24.02 |
| 6,443,687 B1 | * | 9/2002 | Kaiser .......................... 414/685 |
| 6,540,243 B2 | * | 4/2003 | Takayanagi et al. ....... 280/93.51 |
| 7,198,278 B2 | * | 4/2007 | Donaldson ................. 280/6.156 |

FOREIGN PATENT DOCUMENTS

| | | |
|---|---|---|
| GB | 2 402 658 | 12/2004 |
| WO | WO 2005/056308 | 6/2005 |

* cited by examiner

US 9,174,488 B2

PIVOTING AXLE SYSTEM

CROSS-REFERENCES TO RELATED APPLICATIONS

This application is a continuation-in-part (CIP) of U.S. patent application Ser. No. 13/789,728, filed Mar. 8, 2013, pending, which claims the benefit of U.S. Provisional Patent Application No. 61/612,597, filed Mar. 19, 2012, the entire content of each of which is herein incorporated by reference.

STATEMENT REGARDING FEDERALLY SPONSORED RESEARCH OR DEVELOPMENT (Not Applicable)

BACKGROUND OF THE INVENTION

The invention relates to a boom lift product and, more particularly, to supporting structure for a boom lift product that is expandable and retractable between a stowed/transport position and a working position.

It is desirable with a boom lift product to provide a stable and secure base when a platform supported at an end of an extendible boom is used in a raised position. Stability can be achieved through the use of outriggers, counterweights and the like. A wider wheel base also provides added stability, but a wider wheel base has limitations for transport since a width of the more stable wheel base typically exceeds maximum limitations for transport or on-road travel.

It would be desirable for supporting structure for a boom lift product to include an adjustable wheel base that is wider in a working position and narrower for transport.

Existing machines of this type use a single axle extend cylinder for each axle pair connected between the two associated axles. One deficiency it has is the extension cylinder is relatively low to the ground and relatively unprotected from impact damage such as might be seen when driving into a low object like a fire hydrant or the like. The existing designs may include a slide bar to protect the rod itself but the cylinder as a whole is unprotected from structural deflection or damage. This is of particular concern for a system such as this for if or when the cylinder is impacted, the force of contact may allow the angle of the axle to change as the cylinder deforms (if the cylinder is no longer straight, the distance between the connections to the axles and or frame would be shorter). This would result in the axles retracting to some extent unintentionally and would risk the machine stability due to a shifting of the tip line of the machine.

BRIEF SUMMARY OF THE INVENTION

The invention provides for a pivoting axle system for a boom lift where separate axles for each of the vehicle's four wheels are pivotable for operation in a stowed (transport) position and an extended (working) position.

The invention also addresses the drawbacks noted above with regard to existing machines of this type. Specifically, the structure of the preferred embodiments incorporates features that minimize the damage risk. The frame and cylinders have stops incorporated that limit the movement of the axles if they would be impacted by something such as a fire hydrant or the like.

In an exemplary embodiment, a pivoting axle system for an aerial lift vehicle with a chassis includes a pair of front axles supporting a corresponding pair of front wheels and a pair of rear axles supporting a corresponding pair of rear wheels. The front and rear axles are pivotally secured to the chassis at respective pivot points. The front and rear axles are selectively positionable between a transport position, where the front wheels are a first narrow distance apart from each other and the rear wheels are a second narrow distance apart from each other, and a working position, where the front wheels are a first wide distance apart from each other and the rear wheels are a second wide distance apart from each other. The system also includes hydraulic cylinders connected between the chassis and each of the front and rear axles. The hydraulic cylinders are connected to the chassis at positions spaced from the pivot points, and in the working position, the hydraulic cylinders are prevented from deflection beyond a yield point.

The system may further include a first stop member disposed on a chassis side of each of the hydraulic cylinders, and corresponding second stop members disposed on the chassis in a facing relationship with the first stop members. The first and second stop members cooperatively prevent the hydraulic cylinders from deflection beyond the yield point. In this context, the system may also include shims coupled with at least one of the first stop members and the second stop members. The shims define a predetermined clearance space between the first and second stop members when the front and rear axles are positioned in the working position. The predetermined clearance space may be 6-10 mm. The shims may be coupled with the first stop members. The predetermined clearance space may include a maximum clearance for hydraulic cylinder deflection without reaching the yield point. The first stop members may be welded onto the hydraulic cylinders, and the second stop members may be welded onto the chassis.

In another exemplary embodiment, a pivoting axle system for an aerial lift vehicle with a chassis includes a left axle supporting a left wheel and a right axle supporting a right wheel. The left and right axles are pivotable between a transport position and a working position. A first hydraulic cylinder is connected at one end to the chassis on a right side of a vehicle center line and at an opposite end to the left axle, and a second hydraulic cylinder is connected at one end to the chassis on a left side of the vehicle center line and at an opposite end to the right axle. In the working position, the first and second hydraulic cylinders are prevented from deflection beyond a yield point.

In the transport position, a distance between the left and right axles may be minimum, and in the working position, the distance between the left and right axles may be maximum.

BRIEF DESCRIPTION OF THE DRAWINGS

These and other aspects and advantages of the preferred embodiments will be described in detail with reference to the accompanying drawings, in which.

DETAILED DESCRIPTION OF THE INVENTION

Figure 1:
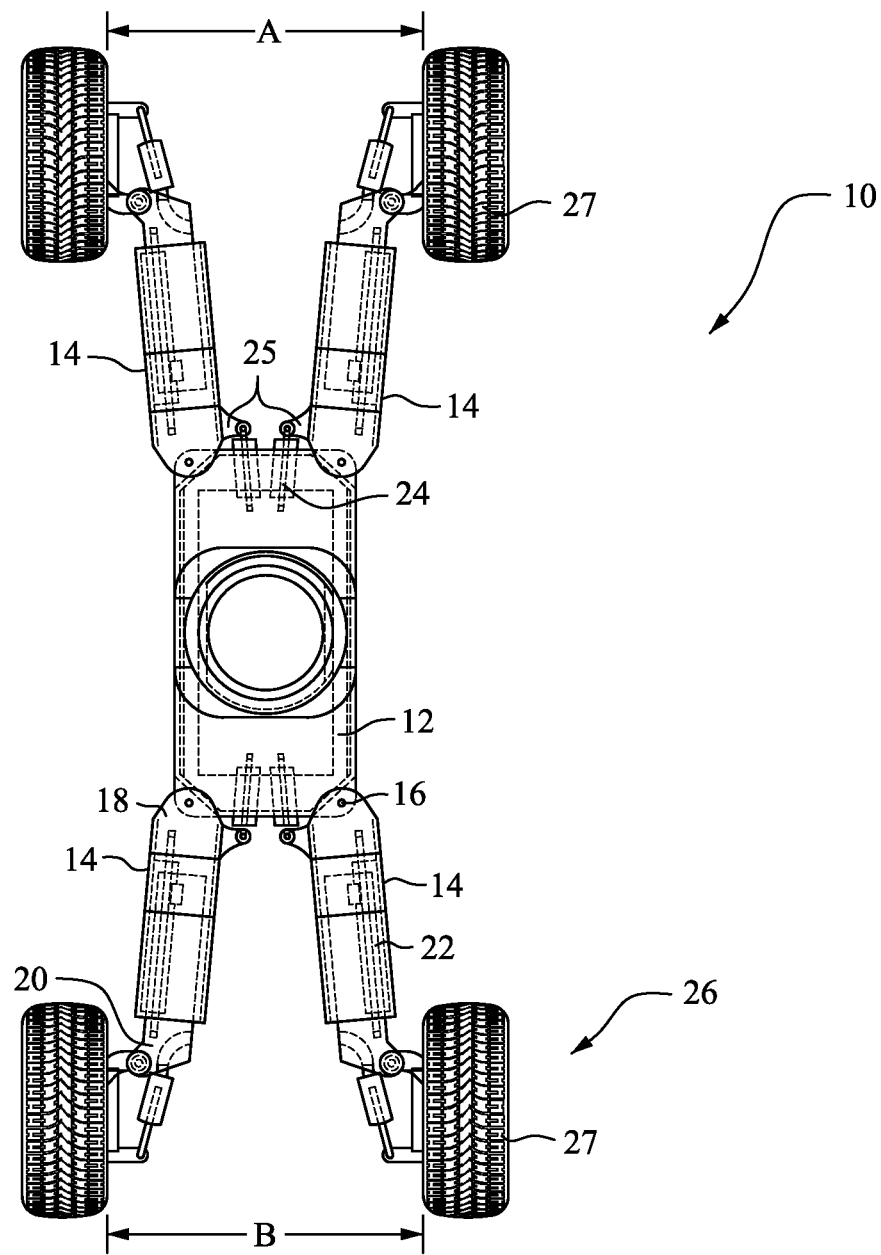
FIG. 1 shows a chassis assembly with the pivoting axle system in a stowed position.
Figure 2:
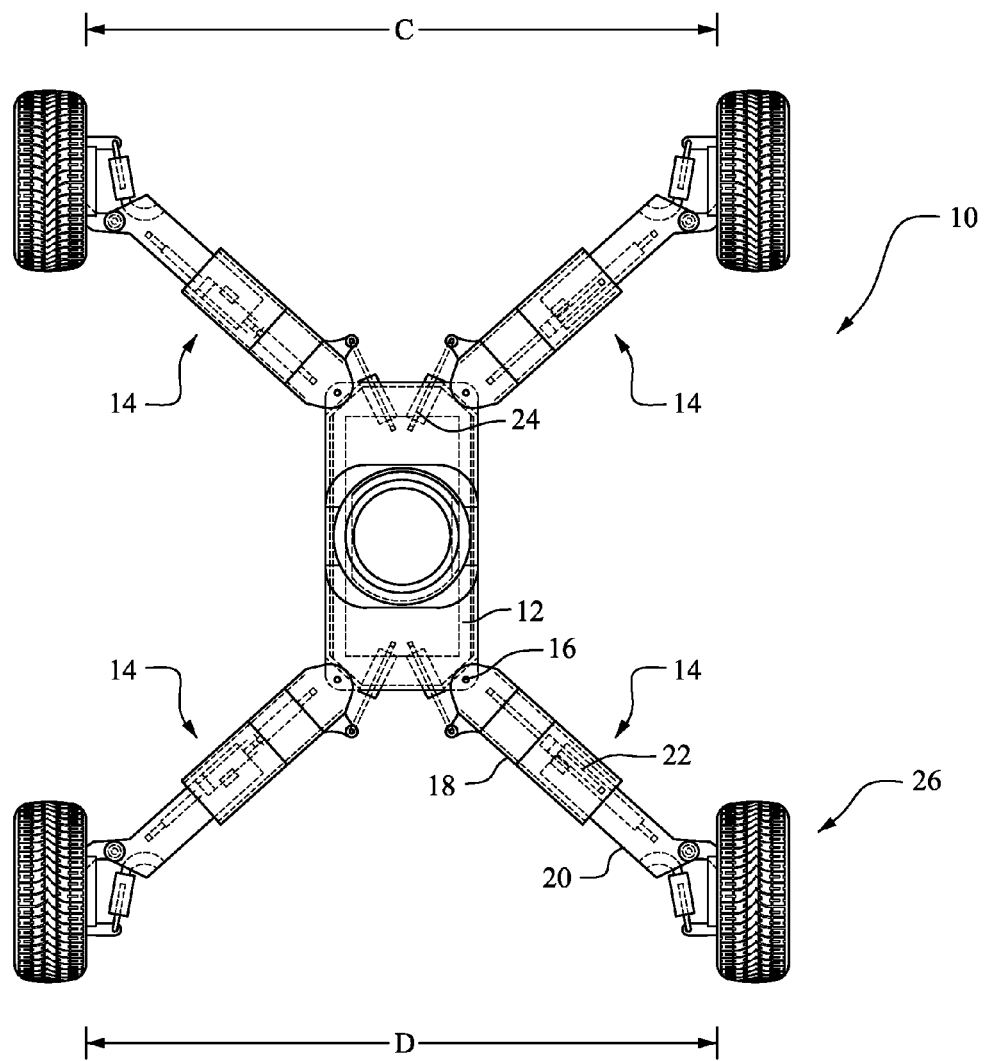
FIG. 2 shows the chassis assembly with the pivoting axle system in a working position.

FIG. 1 shows a chassis assembly according to preferred embodiments of the invention in the stowed position, and FIG. 2 shows the chassis assembly in the working position. The chassis assembly 10 includes a chassis 12 and four independently controllable axles 14, including a pair of front axles and a pair of rear axles. Each of the axles 14 is pivotally secured to the chassis 12 via a pivot connection 16. Each axle 14 is independently controllable (i.e., separately operable), and the respective axles 14 are not connected to one another. Actuators 24 are connected between the chassis 12 and each of a plurality of axles 14, respectively. As shown in the drawings, the actuators 24 are connected to the chassis 12 at positions spaced from the pivot points 16. Actuator brackets 25 are connected to each of the plurality of axles 14, respectively. The actuators 24 are connected between the chassis 12 and respective connecting points of the actuator brackets 25. As shown, the connecting points are positioned offset from longitudinal axes of the axles 14. Preferably, the actuators 24 are hydraulic actuators.

Each of the axles 14 may possibly be provided as a multi-section telescoping axle (two-section shown) including at least a base section 18, which is pivoted to the chassis 12 via the pivot connection 16, and a movable section 20 mounted to extend or retract relative to the base section 18 on operation of drive means within the sections. An exemplary drive means includes a ram 22 (e.g., a hydraulic ram) connected between the base section 18 and the movable section 20.

A tire or wheel assembly 26 including a spindle and king pin is mounted at an outer (distal) end of the inner section 20. The wheel assemblies 26 include respective wheels or tires 27. The axles 14 and tire assembly 26 act as a support for the chassis 12. As shown, the vehicle includes four such support assemblies. That is, the two front axles support a corresponding two front wheel assemblies, and the two rear axles support a corresponding two rear wheel assemblies.

In the stowed or transport position (FIG. 1), the axles 14 are moved inward via the cylinders 24, and the front wheel assemblies (and the rear wheel assemblies) are closer together to facilitate transport. That is, in the stowed position, the front wheels are a first distance apart from each other (see arrow A in FIG. 1) and the rear wheels are a second distance apart from each other (see arrow B in FIG. 1). With the telescoping axles, in the stowed position, the inner sections 20 are fully retracted. In the working position, the axles 14 are pivoted outwards such that the front wheel assemblies (and the rear wheel assemblies) are farther apart to provide added stability. That is, in the working position, the front wheels are a third distance apart from each other (see arrow C in FIG. 2) and the rear wheels are a fourth distance apart from each other (see arrow D in FIG. 2). As shown, the third distance C is greater than the first distance A, and the fourth distance D is greater than the second distance B. With the telescoping axles, the inner sections 20 are telescopically extended in the working position.

To accommodate ground friction and to facilitate shifting the assembly between positions, it is typical for the vehicle to be moving when extending or retracting the chassis assembly. That is, the vehicle drive system communicates with the wheel assemblies 26, and the actuators 24 are configured to pivot the plurality of axles 14 between the stowed position and the working position while the drive system drives the wheel assemblies.

Because the axles 14 and tire assemblies 26 are independently controllable, the system can operate in various steering modes including, without limitation, straight steering, crab steering, two-wheel steering, coordinated steering, etc.

Figure 3:
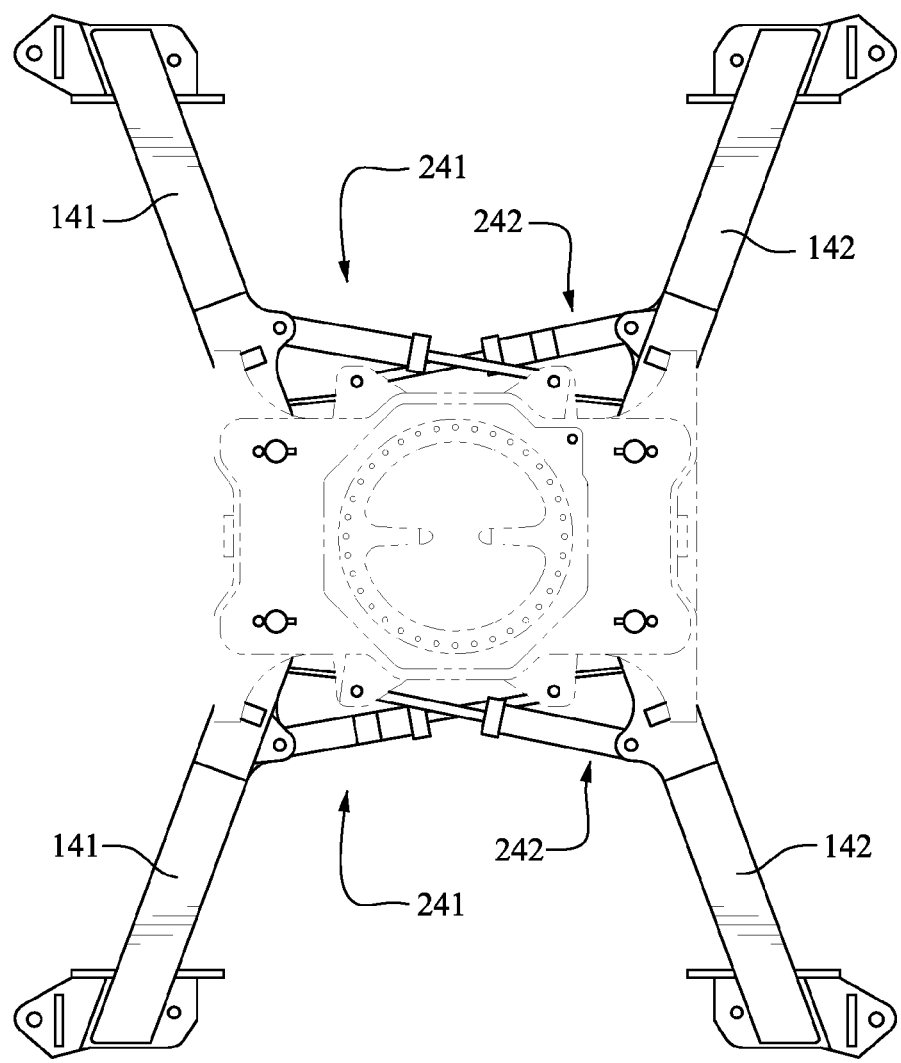
FIG. 3 shows a chassis assembly of an alternative embodiment.
Figure 4:
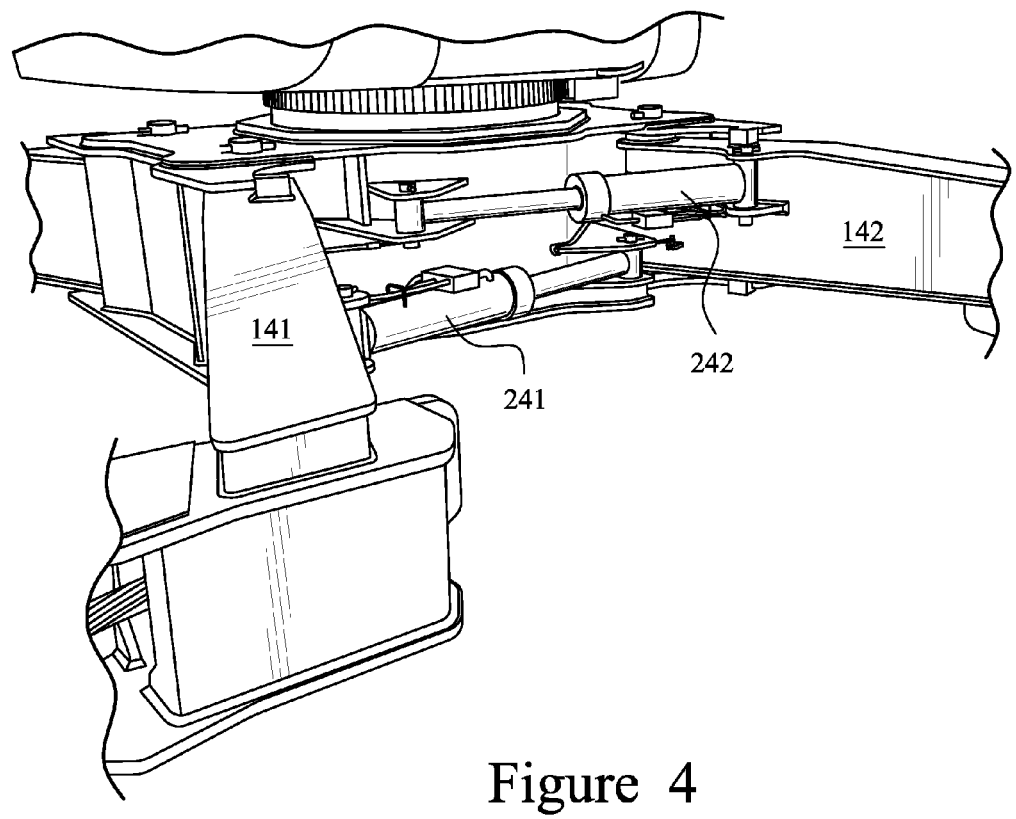
FIG. 4 is a perspective view of the chassis assembly in FIG. 3.

FIGS. 3-6 show an alternative configuration of the pivoting axle system. In FIG. 3, the pivoting axle system includes a left axle 141 supporting a left wheel or tire 27 and a right axle 142 supporting a right wheel or tire 27. The left and right axles 141, 142 are pivotable between a transport position and a working position. A first actuator (e.g., hydraulic cylinder) 241 is connected at one end to the chassis on a right side of a vehicle center line and at an opposite end to the left axle 141. A second actuator 242 is connected at one end to the chassis on a left side of the vehicle center line and at an opposite end to the right axle 142. FIG. 4 is a perspective view of the criss-cross orientation of the cylinders 241, 242.

As noted, it is desirable to prevent the hydraulic cylinders 24, 241, 242 from deflection beyond a yield point. In this context, the assembly preferably includes a first stop member 32 disposed on a chassis side of each of the hydraulic cylinders 24, 241, 242. Corresponding second stop members 34 are disposed on the chassis in a facing relationship with the first stop members 32. As shown, it is preferable that the first stop members 32 are welded onto the hydraulic cylinders, and the second stop members 34 are welded onto the chassis. In use, the first and second stop members 32, 34 cooperatively prevent the hydraulic cylinders from deflection beyond the yield point for loads substantially in the horizontal direction.

Figure 5:
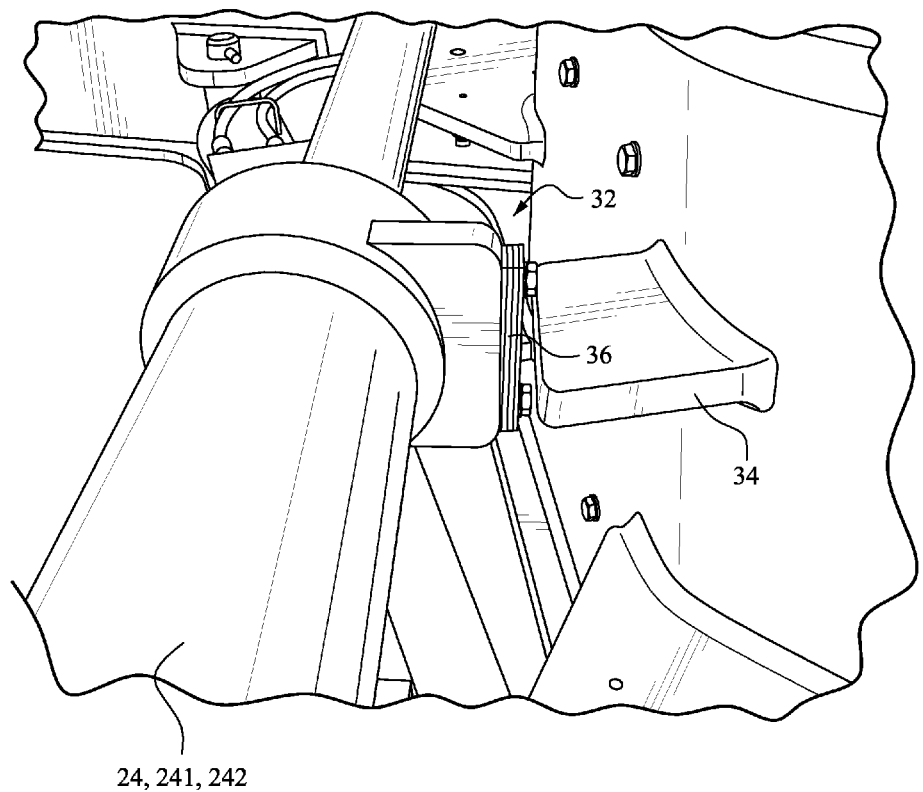
FIGS. 5 and 6 are close-up views of the stops on the frame and cylinder.
Figure 6:
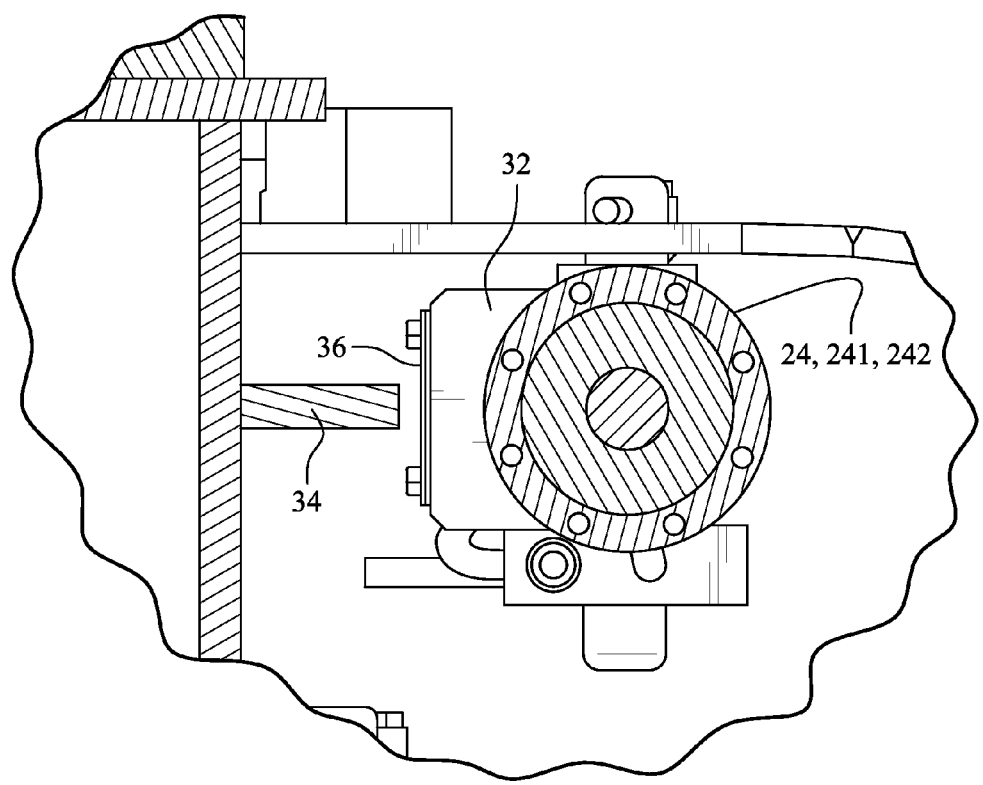

With continued reference to FIGS. 5 and 6, one or more shims 36 are connected to the first stop member 32. The shims 36 may alternatively be coupled with the second stop member 34. The shims 36 define a predetermined clearance space between the first and second stop members 32, 34 when the axles are positioned in the working position. The predetermined clearance space is established as a maximum clearance for hydraulic cylinder deflection without reaching the yield point (e.g., caused by an impact from a substantially horizontal force). An exemplary range for the predetermined clearance space is 6-10 mm.

In a preferred solution, the second stops 34 are welded to the frame/axle approximately mid-length of each cylinder when the axles are fully extended, and the first stops 32 are welded to the cylinders at approximately the same position. As noted, the spacing between these stops is shimmed to have a minimum clearance to avoid collisions of the stops when the axles are being moved by the operator during the axle extension process. A maximum clearance is set to a value to limit the movement of the cylinder if or when it is impacted by driving into a fire hydrant or the like. In this case, it is set to a dimension that ensures the cylinder would not be permanently yielded if it is fully deflected to the point where contact between the stops occurs. In other words, the cylinder will hit the stops before the cylinder yields and before the axles significantly change angle.

This system adds robustness to the design to improve the durability and improves the user experience of the machine.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A pivoting axle system for an aerial lift vehicle including a chassis, the pivoting axle system comprising:
 a pair of front axles supporting a corresponding pair of front wheels;
 a pair of rear axles supporting a corresponding pair of rear wheels,
 the front and rear axles being pivotally secured to the chassis at respective pivot points, wherein the front and rear axles are selectively positionable between a transport position, where the front wheels are a first narrow distance apart from each other and the rear wheels are a second narrow distance apart from each other, and a working position, where the front wheels are a first wide distance apart from each other and the rear wheels are a second wide distance apart from each other;

hydraulic cylinders connected between the chassis and each of the front and rear axles, wherein the hydraulic cylinders are connected to the chassis at positions spaced from the pivot points;

a first stop member disposed on each of the hydraulic cylinders on a chassis side of each of the hydraulic cylinders; and corresponding second stop members disposed on the chassis in a facing relationship with the first stop members, wherein in the working position, the first and second stop members cooperatively prevent the hydraulic cylinders from deflection beyond a yield point.

2. A pivoting axle system according to claim 1, further comprising shims coupled with at least one of the first stop members and the second stop members, the shims defining a predetermined clearance space between the first and second stop members when the front and rear axles are positioned in the working position.

3. A pivoting axle system according to claim 2, wherein the shims are coupled with the first stop members.

4. A pivoting axle system according to claim 2, wherein the predetermined clearance space comprises a maximum clearance for hydraulic cylinder deflection without reaching the yield point.

5. A pivoting axle system according to claim 1, wherein the first stop members are welded onto the hydraulic cylinders, and wherein the second stop members are welded onto the chassis.

6. A pivoting axle system for an aerial lift vehicle including a chassis, the pivoting axle system comprising:

a left axle supporting a left wheel;

a right axle supporting a right wheel, the left and right axles being pivotable between a transport position and a working position;

a first hydraulic cylinder connected at one end to the chassis on a right side of a vehicle center line and at an opposite end to the left axle, the first hydraulic cylinder displacing the left axle between the transport position and the working position; and a second hydraulic cylinder connected at one end to the chassis on a left side of the vehicle center line and at an opposite end to the right axle, the second hydraulic cylinder displacing the right axle between the transport position and the working position, wherein in the working position, the first and second hydraulic cylinders are prevented from deflection beyond a yield point.

7. A pivoting axle system according to claim 6, further comprising:

a first stop member disposed on a chassis side of each of the first and second hydraulic cylinders; and corresponding second stop members disposed on the chassis in a facing relationship with the first stop members, the first and second stop members cooperatively preventing the first and second hydraulic cylinders from deflection beyond the yield point.

8. A pivoting axle system according to claim 7, further comprising shims coupled with at least one of the first stop members and the second stop members, the shims defining a predetermined clearance space between the first and second stop members when the left and right axles are positioned in the working position.

9. A pivoting axle system according to claim 8, wherein the shims are coupled with the first stop members.

10. A pivoting axle system according to claim 8, wherein the predetermined clearance space comprises a maximum clearance for hydraulic cylinder deflection without reaching the yield point.

11. A pivoting axle system according to claim 8, wherein the predetermined clearance space is 6-10 mm.

12. A pivoting axle system according to claim 6, wherein in the transport position, a distance between the left and right axles is minimum, and in the working position, the distance between the left and right axles is maximum.

13. A pivoting axle system according to claim 6, further comprising stops configured to define a predetermined space between the first and second hydraulic cylinders and the chassis, the predetermined space being defined with at least one shim coupled with the stops.

14. A pivoting axle system for an aerial lift vehicle including a chassis, the pivoting axle system comprising:

a left axle supporting a left wheel;

a right axle supporting a right wheel, the left and right axles being pivotable between a transport position and a working position;

a first hydraulic cylinder connected at one end to the chassis on a right side of a vehicle center line and at an opposite end to the left axle;

a second hydraulic cylinder connected at one end to the chassis on a left side of the vehicle center line and at an opposite end to the right axle;

a first stop member disposed on a chassis side of each of the first and second hydraulic cylinders; and corresponding second stop members disposed on the chassis in a facing relationship with the first stop members, wherein in the working position, the first and second stop members cooperatively prevent the first and second hydraulic cylinders from deflection beyond a yield point, wherein the first stop members are welded onto the hydraulic cylinders, and wherein the second stop members are welded onto the chassis.

* * * * *